Dec. 14, 1971 G. SIRONI ET AL 3,627,481
PROCESS FOR THE PURIFICATION OF TITANIUM TETRACHLORIDE
Filed May 6, 1969
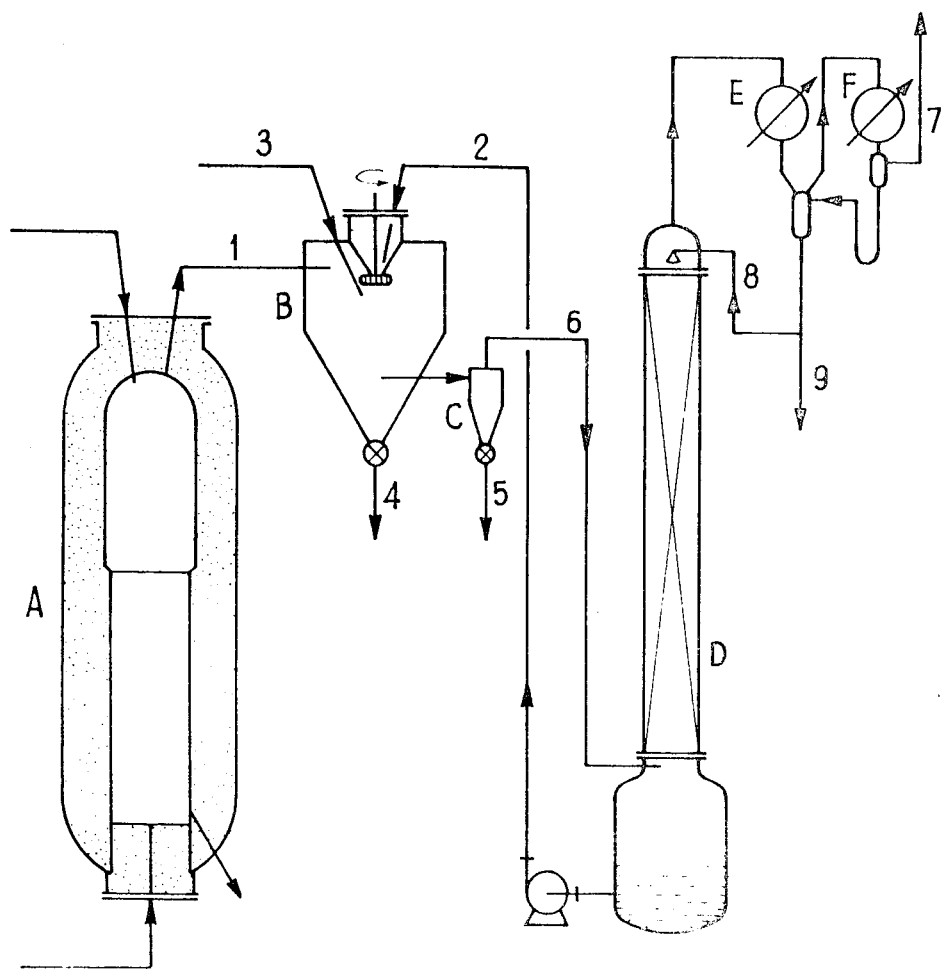
INVENTORS
GIUSEPPE SIRONI,
RENZO SACERDOTE,
FRANCESCO FERRERO
BY Stevens, Davis, Miller & Mosher
ATTORNEYS United States Patent Office 3,627,481
Patented Dec. 14, 1971

3,627,481
PROCESS FOR THE PURIFICATION OF TITANIUM TETRACHLORIDE
Giuseppe Sironi, Renzo Sacerdote, and Francesco Ferrero, Novara, Italy, assignors to Montecatini Edison S.p.A., Milan, Italy
Filed May 6, 1969, Ser. No. 822,110
Claims priority, application Italy, May 10, 1968, 16,324/68
Int. Cl. C01g 23/02
U.S. Cl. 23—87 TP                                6 Claims

ABSTRACT OF THE DISCLOSURE

A process is disclosed for the purification of titanium tetrachloride from vanadium compounds by treatment with $H_2S$, wherein the hot gases coming from the chlorination step of the titaniferous material, containing $TiCl_4$ with impurities, are cooled down to 130–180° C. by injection and vaporization of liquid $TiCl_4$ and at the same time are treated with $H_2S$, thereby obtaining a vanadium-free gaseous phase containing $TiCl_4$ and a $TiCl_4$-free solid phase containing vanadium.

---

The present invention relates to a process for the purification of titanium tetrachloride from vanadium compounds.

In commercial processes for producing $TiCl_4$, titaniferous ores are chlorinated, such as for instance rutile, leucoxene, ilmenitic slags, artificial rutile, etc. These materials contain more or less significant amounts of impurities, such as vanadium-, zirconium-, silicon-, aluminum-, iron-, chromium-oxides, etc., which are chlorinated together with the main component which is $TiO_2$.

The hot gases coming from the chlorination reactor are cooled down, in general by injection and vaporization of liquid $TiCl_4$, to a temperature only slightly above the dew point of $TiCl_4$ which is a function of the $TiCl_4$ content in the gases.

This operation is carried out in order to separate the entrained solids (titaniferous ore, coke and other non-chlorinated solids as for instance $ZrSiO_4$) and the volatile chlorides which desublimate or condense ($FeCl_2$, $FeCl_3$, $ZrCl_4$, $CrCl_3$, etc.). Such an operation may conveniently be carried out in a spray-quencher from which the entrained solids and the desublimated or condensed chlorides are discharged free of $TiCl_4$.

The raw $TiCl_4$, which is subsequently condensed after leaving the spray quencher, still contains dissolved in it metal chlorides and oxychlorides ($SiCl_4$, $VOCl_3$, $VCl_4$, $AlCl_3$, etc.) which must be eliminated before the $TiCl_4$ is used for the production of $TiO_2$ pigment or of metal titanium. Some chlorides may be separated by rectification (for instance $SiCl_4$), while the vanadium compounds require a chemical treatment before rectification in order to convert the volatile compounds into solid products.

According to some processes of the prior art, it is possible to bring about the conversion of the volatile vanadium chlorides into solid products ($VOCl_2$, $VCl_3$, vanadium sulphides) through the treatment of $TiCl_4$ with hydrogen sulphide.

By operating on liquid raw $TiCl_4$ (U.S. Pat. No. 2,289,327; U.S. Pat. No. 2,836,547) one obtains a suspension of solids in the $TiCl_4$ which is subjected to rectification, either as such or after separation of the greatest part of the solids themselves by thickening. Such a technique has, however, considerable drawbacks, and in particular:

the necessity to use numerous apparatuses for the treatment of the $TiCl_4$ with $H_2S$ and for the separation of the solids by thickening;

the necessity to carry out the evaporation of the $TiCl_4$, treated with $H_2S$ and optionally clarified, in boilers which become contaminated or fouled by the solids left in the $TiCl_4$;

the necessity to manipulate and dry the obtained sludges, in order to recover the $TiCl_4$ contained therein in considerable amounts with respect to the total production; and the necessity to carry out the drying of the vanadium-containing slurries in the absence of $Cl_2$ and/or other oxidizing gases, for instance air, in order to avoid the conversion of the solid vanadium compounds into volatile compounds.

According to British Patent No. 866,771, the treatment of the raw $TiCl_4$ with $H_2S$ may be carried out in vapor phase in a fluid bed of inert solids, such as sand, at temperatures between 140° and 300° C. However, this technique has considerable drawbacks because at low temperatures (140° to 160° C.) the elementary sulphur, formed during the reaction of $H_2S$ with the vanadium compounds, is in the liquid state and defluidizes the bed, while at higher temperatures the sulphur passes into the $TiCl_4$ as a vapor. In the latter case difficulties arise in connection with the rectification of the $TiCl_4$. Furthermore, a strong excess of $H_2S$ is used, which is then dissolved in the $TiCl_4$ that has to be rectified.

It is therefore an object of the present invention to provide a process for the purification of $TiCl_4$ from vanadium compounds through treatment with hydrogen sulphide which shall not have the previously-cited drawbacks.

Another object of this invention is to provide a process for the purification of $TiCl_4$ by means of which it is possible to obtain titanium tetrachloride with a very low content of vanadium compounds, lower than 1 p.p.m. of vanadium (expressed as metallic vanadium), which is therefore eminently suitable for the production of $TiO_2$ of excellent pigmentary characteristics and for the production of metal titanium of great purity.

Still another object of this invention is to separate the vanadium impurities as solid products together with the solids entrained from the chlorination gases, and together with the volatile chlorides which desublimate or condense.

These and still other objects are attained by the process of this invention, according to which the hot gases coming from the chlorination of the titaniferous material are cooled down to 130°–180° C. by injection and vaporization of liquid $TiCl_4$ and, at the same time, are treated with hydrogen sulphide, thereby obtaining a vanadium-free gaseous phase containing the $TiCl_4$, and a $TiCl_4$-free solid phase containing vanadium, this solid phase being discharged.

The cooling down of the gases and the treatment with $H_2S$ are preferably carried out in a spray-quencher evaporator. The solid vanadium compounds thus formed are discharged from the spray-quencher free of $TiCl_4$, together with the other solids (titaniferous material and coke, dragged downstream of the reactor, and desublimated or condensed chlorides). The gases and the vapors flowing out of the spray-quencher pass through a cyclone and a washing apparatus supplied with liquid $TiCl_4$ in order to precipitate the fine solids entrained by the gases. The washing apparatus may be, for instance, a Venturi-scrubber, a splash-scrubber or a scrubbing column; from the bottom of the apparatus is then discharged the liquid $TiCl_4$ containing the fine solids dragged downstream of the cooling, this liquid $TiCl_4$ being then re-cycled into the spray-quencher. The gases and the vapors flowing out of the washing apparatus, and which consist of $TiCl_4$, $SiCl_4$, and of uncondensables ($CO_2$, CO, $N_2$, etc.), are cooled down in order to condense the $TiCl_4$ and to separate the uncondensables. The condensed $TiCl_4$ is then partly re-cycled into the washing apparatus, while the balance is rectified in a column to obtain $SiCl_4$ as head product, and $TiCl_4$ as tail product, this residue containing less than 1 p.p.m. of vanadium.

For 1 mole of vanadium compounds in the $TiCl_4$ there are used from 1 to 3 moles of $H_2S$. If unconverted chlorine is present, then it will be necessary to add the corresponding molar quantity of $H_2S$. The contact time in the spray-quencher must be sufficiently long to allow the completion of the reaction between the $H_2S$ and the vanadium compounds; this contact time must be at least 10 seconds long, but preferably should be between 15 and 50 seconds.

The attached drawing represents a flow diagram according to the present invention.

Into chlorinator A, which is a conventional fluid-bed reactor, titaniferous ore and coke are fed from above while the chlorine-containing gas is fed from below.

The reaction gases coming out of chlorinator A contain $TiCl_4$ and vapors of metal chlorides together with various other gases ($CO_2$, CO, HCl and unconverted $Cl_2$, if any). These gases entrain a more or less significant amount of solids (titaniferous ore, coke and other non-chlorinated solids such as $ZrSiO_4$).

The gaseous stream has a temperature of around 900° C., that is, just slightly lower than that of the reactor bed. Through 1 the reaction gases are conveyed into the spray-quencher B, where they are cooled down by injection and vaporization of a suitable amount of recycled liquid $TiCl_4$ sent in through 2.

The recycled amount is from 3 to 5 times the $TiCl_4$ produced. In apparatus B the gases are thus cooled down to a temperature ranging from 130° to 180° C., but preferably to a temperature between 145° and 155° C., that is, at a temperature above the dew point of the $TiCl_4$ although still low enough to show a negligible vapor tension of the high-boiling chlorides and of the sulphur.

Into the same spray-quencher B is introduced through 3 an amount of $H_2S$ sufficient, as already specified, to reduce the vanadium compounds and to block the action of the unconverted chlorine eventually present.

At the above-indicated temperature, the iron and zirconium chlorides, etc. are in the solid state, just like the vanadium compounds that are formed following the treatment with $H_2S$. These solids, together with the solids dragged from the chlorination bed, incorporate the molten elementary sulphur formed in the reaction between $H_2S$ and the vanadium compounds and the $Cl_2$, if any; these solids are continuously discharged from B through 4 and from cyclone C, placed down-stream of B, through 5.

The vanadium-free gases, containing the $TiCl_4$ vapors and the finest solids, pass from cyclone C through 6 to the scrubbing column D. From the head of D, $TiCl_4$ and the low-boiling chlorides, for instance $SiCl_4$, are condensed in condenser E. The uncondensable gases containing small amounts of $TiCl_4$ pass into a brine cooler F downstream of E and are discharged to the stack through 7 or are used for their content of CO. The condensed liquid is partly conveyed as a reflux to head D through 8. That portion of the condensed $TiCl_4$ which is not recycled constitutes the production of the system, and is conveyed through 9 to the final rectification. From the bottom of column D, through 2, the liquid $TiCl_4$ is recycled into spray-quencher B.

Thus, according to the present invention, in the spray-quenching apparatus alone there takes place simultaneously the cooling of the gases, the precipitation and discharging of the solids, and the direct purification of the $TiCl_4$ from the vanadium compounds.

The advantages of this invention may be thus summarized:

With respect to the treatment of the raw $TiCl_4$ with $H_2S$ in liquid phase, there are eliminated all the apparatuses used in that treatment for thickening and manipulating the resulting sludges. Furthermore, there is also eliminated the re-boiler of the first rectifying column and consequently all the difficulties deriving from its progressive fouling are eliminated.

With the present invention one also attains a substantial saving in heat, because in this way one avoids the first vaporization of the $TiCl_4$ to be rectified.

With respect to the fluid-bed method, the workability of the system which is the object of this invention is definitely superior. As a matter of fact, the solids are discharged from the spray-quencher without difficulty, thanks to the presence of the solids admixed with the molten sulphur which never occurs in such percentages as to interfere with their flowability.

The feeding of the $H_2S$ into the spray-quencher will block the possibly unconverted $Cl_2$ flowing out of the reactor, which otherwise would hinder the purification of the $TiCl_4$ with respect to the vanadium compounds.

The temperature of the spray-quencher is maintained at such a level as to minimize the vaporization of the sulphur by the gases.

The following examples are given for purely illustrative purposes for further clarifying the invention idea:

EXAMPLE 1

Into a fluid-bed reactor are fed continuously 170 kg./hr. of a rutile-coke mixture having 19% by weight of petroleum coke. The rutile and the coke have the following percentage composition (by weight):

Rutile mineral:

| | Percent |
|---|---|
| $TiO_2$ | 97.34 |
| $Fe_2O_3$ | 0.51 |
| $V_2O_5$ | 0.55 |
| $SiO_2$ | 0.74 |
| $Cr_2O_3$ | 0.17 |
| $Al_2O_3$ | 0.15 |
| $ZrO_2$ | 0.30 |

Petroleum Coke:

| | |
|---|---|
| C | 98.03 |
| H | 0.87 |
| S | 0.96 |
| Ashes | 0.33 |

The chlorination is carried out at a temperature of 950° C. by continuously introducing at the bottom of the reactor 240 kg./hr. of chlorine.

The gaseous mixture, free of $Cl_2$, when flowing out of the reactor shows the following composition expressed in percentages (by volume):

| | Percent |
|---|---|
| $TiCl_4$ | 44.53 |
| $VOCl_3 + VCl_4$ | 0.22 |
| $FeCl_2$ | 0.23 |
| $ZrCl_4$ | Traces |
| $AlCl_3$ | 0.10 |
| $SiCl_4$ | 0.22 |
| $CrCl_3$ | 0.08 |
| CO | 18.20 |
| $CO_2$ | 36.40 |

This gaseous mixture is cooled down to 150° C. in the spray-quencher by vaporization of 1220 kg./hr. of recycled $TiCl_4$. Into this same spray-quencher are also introduced 0.45 N m.³/hr. of $H_2S$. The contact time of the gases and vapors is about 40 seconds. From the bottom of the spray-quencher and from the succeeding cyclone there is discharged a mixture of solids which contains about 5 kg./hr. of rutile, coke and inert material and about 2.8 kg./hr. of desublimated or condensed solids and of solids formed from $H_2S$ and volatile vanadium compounds, and 0.32 kg./hr. of elementary sulphur. The total sulphur present in the mixture of solids is about 4.9% by weight, of which 80% is in the form of elemental sulphur.

In this operation all the vanadium is precipitated and is found in the solids discharged from the spray-quencher (about 6% by weight).

The gaseous mixture (dew point 125° C.) flows out of the cyclone and enters the bottom of the scrubbing column. The vapors coming from the head of the column are condensed and the uncondensable substances are discharged through the stack. 1220 kg./hr. of $TiCl_4$, an amount corresponding to the feed of the liquid $TiCl_4$ into the spray-quencher, are conveyed as a reflux to the column for scrubbing the in-flowing gaseous mixture to remove the finest solids and the traces of iron chlorides; 318 kg./hr. constitute the produced $TiCl_4$ containing less than 0.5 p.p.m. of vanadium and undetectable traces of iron. In the liquid of the bottoms from the column, recycled to the spray-quencher, the amount of suspended solids is less than 0.1% by weight.

EXAMPLE 2

Into a fluid-bed reactor are fed 221 kg./hr. of rutile and coke in the same ratio as that of the preceding example. The composition of the solids is the same as that of Example 1.

From the bottom of the reactor, through a gas distributor, are fed 312 kg./hr. of chlorine at 100%. The conversion of the $Cl_2$ is 98%. The gases leaving the reactor contain on the average 1.7% by volume of free $Cl_2$. They pass into the spray-quencher, operating at 180° C., and into which are injected 1500 N m.³/hr. of recycled $TiCl_4$ and separately 2.4 N m.³/hr. of $H_2S$. The contact time of the gases and vapors is about 30 seconds.

From the bottom of the spray-quencher all the entrained desublimated and condensed solid products are discharged continuously. The sulphur content of these solids is about 25% by weight. The vanadium present in said solids is about 2.3% by weight. The $TiCl_4$ vapors flowing out of the spray-quencher (dew point 125° C.) are treated as in Example 1; thereby there are obtained 410 kg./hr. of $TiCl_4$ containing less than 0.5 p.p.m. of vanadium.

What is claimed is:

1. In a process for the purification of titanium tetrachloride from vanadium compounds by treatment with $H_2S$, the improvement wherein the hot gases coming from the step of chlorinating a mixture of rutile ore and coke, and containing $TiCl_4$ together with impurities, are cooled down to 130°–180° C. by injection and vaporization of liquid $TiCl_4$ and at the same time are treated with $H_2S$, thereby obtaining a vanadium-free gaseous phase containing $TiCl_4$ and a $TiCl_4$-free solid phase containing vanadium, wherein from 1 to 3 moles of $H_2S$ per 1 mole of vanadium compound are used and the contact time of the chlorination gases with the $H_2S$ is at least 10 seconds.

2. A process according to claim 1, wherein the treatment with $H_2S$ is carried out in a spray-quencher.

3. A process according to claim 1, wherein the contact time is between 15 and 50 seconds.

4. A process according to claim 1, wherein for the treatment of the gases coming from the chlorination step and also containing unreacted chlorine, the $H_2S$ is added in a molar quantity equal to the chlorine present in addition to that required by the vanadium.

5. A process according to claim 1, wherein the gases after treatment with $H_2S$ are washed with liquid $TiCl_4$, and then cooled to condense the $TiCl_4$ vapor part of which is recycled to the washing step and the balance is removed as product, while the liquid $TiCl_4$ flowing out of the washing step is re-cycled back to the cooling and $H_2S$ treatment step.

6. A process according to claim 5, wherein the amount of $TiCl_4$ recycled to the cooling and $H_2S$ treatment step is from 3 to 5 times the amount of $TiCl_4$ produced.

References Cited

UNITED STATES PATENTS

| | | | |
|---|---|---|---|
| 2,245,358 | 6/1941 | Pechukas | 23—87 X |
| 2,289,328 | 7/1942 | Pechukas | 23—87 |
| 2,758,009 | 8/1956 | Guthrie | 23—87 |
| 2,953,218 | 9/1960 | Coates | 23—87 X |

FOREIGN PATENTS

| | | | |
|---|---|---|---|
| 866,771 | 5/1961 | Great Britain | 23—87 |

EDWARD STERN, Primary Examiner

U.S. Cl. X.R.

23—87 R, 87 T